US007280580B1

(12) United States Patent
Haartsen

(10) Patent No.: US 7,280,580 B1
(45) Date of Patent: Oct. 9, 2007

(54) HOP SEQUENCE ADAPTATION IN A FREQUENCY-HOPPING COMMUNICATIONS SYSTEM

(75) Inventor: Jacobus C. Haartsen, Hardenberg (NL)

(73) Assignee: Telefonaktiebolaget LM Ericsson (publ.), Stockholm (SE)

(*) Notice: Subject to any disclaimer, the term of this patent is extended or adjusted under 35 U.S.C. 154(b) by 0 days.

(21) Appl. No.: 09/418,562

(22) Filed: Oct. 15, 1999

(51) Int. Cl.
H04B 1/00 (2006.01)
(52) U.S. Cl. ........................ 375/138; 375/132
(58) Field of Classification Search ............... 375/200, 375/202, 130–153, 267; 455/450, 464; 370/338, 370/333, 330
See application file for complete search history.

(56) References Cited

U.S. PATENT DOCUMENTS

| 4,023,103 | A |   | 5/1977  | Malm |         |
|-----------|---|---|---------|------|---------|
| 4,476,566 | A | * | 10/1984 | Dent ........................ | 375/132 |
| 4,606,040 | A |   | 8/1986  | David et al. |         |
| 4,716,573 | A | * | 12/1987 | Bergstrom et al. ......... | 375/132 |
| 4,780,885 | A | * | 10/1988 | Paul et al. .................. | 375/267 |
| 5,307,348 | A |   | 4/1994  | Buchholz et al. |         |
| 5,323,447 | A | * | 6/1994  | Gillis et al. ................. | 455/464 |
| 5,408,496 | A |   | 4/1995  | Ritz et al. |         |
| 5,515,369 | A |   | 5/1996  | Flammer, III et al. |         |
| 5,619,493 | A |   | 4/1997  | Ritz et al. |         |
| 5,737,358 | A |   | 4/1998  | Ritz et al. |         |
| 5,809,059 | A |   | 9/1998  | Souissi et al. |         |
| 5,832,026 | A |   | 11/1998 | Li |         |
| 5,848,095 | A |   | 12/1998 | Deutsch |         |
| 5,870,391 | A |   | 2/1999  | Nago |         |
| 5,898,733 | A |   | 4/1999  | Satyanarayana |         |
| 6,480,721 | B1| * | 11/2002 | Sydon et al. ............... | 455/464 |

FOREIGN PATENT DOCUMENTS

| EP | 0182762 A1 | 5/1986 |
|----|------------|--------|
| WO | WO99/09671 | 2/1999 |
| WO | WO99/19993 | 4/1999 |

* cited by examiner

Primary Examiner—Curtis Odom
(74) Attorney, Agent, or Firm—Potomac Patent Group PLLC

(57) ABSTRACT

A hop channel is selected for use in a channel hopping communication system that includes a sequence of hop channels, wherein the sequence comprises a set of forbidden hop channels and a remaining set of allowable hop channels. Selection involves selecting a hop channel from the sequence as a function of a present phase. If the selected hop channel is an allowable hop channel, then the selected hop channel is used for communication during the present phase. If the selected hop channel is a forbidden hop channel, then a time-varying parameter is used to select a substitute hop channel from the set of allowable hop channels. The substitute hop channel is then used for communication during the present phase. The time-varying parameter may, for example, be a clock value. With this strategy, the resultant hopping sequence is identical to the original hopping sequence whenever the original sequence calls for an allowable hop channel. In all other cases, a substitute hop channel is dynamically selected from the set of allowable hop channels.

42 Claims, 15 Drawing Sheets

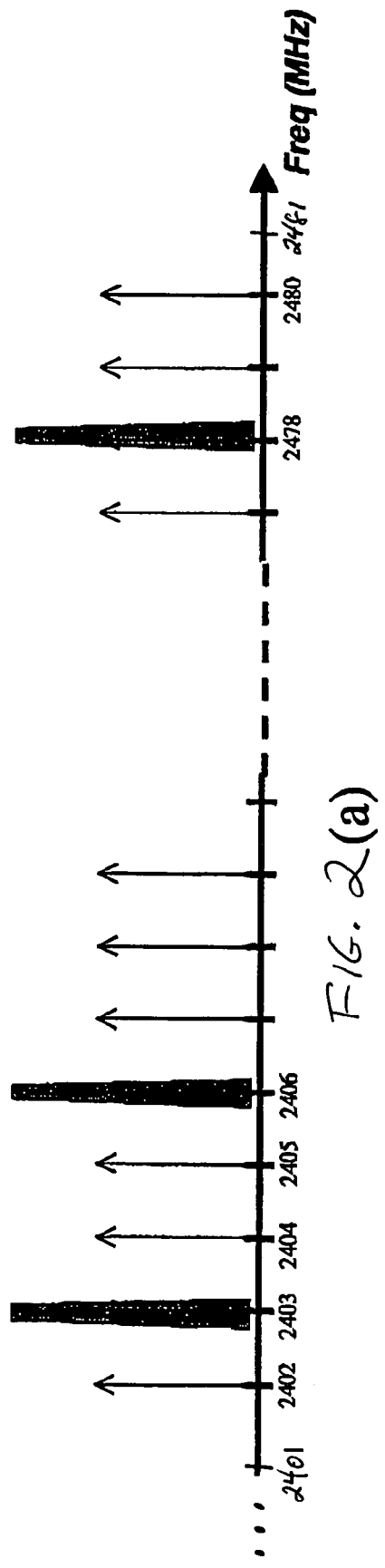
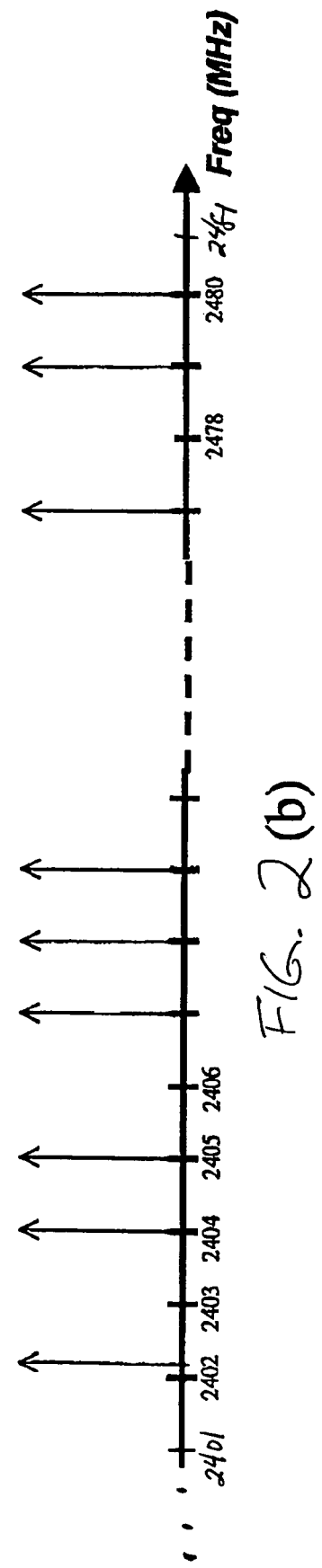
FIG. 2(a)
FIG. 2(b)

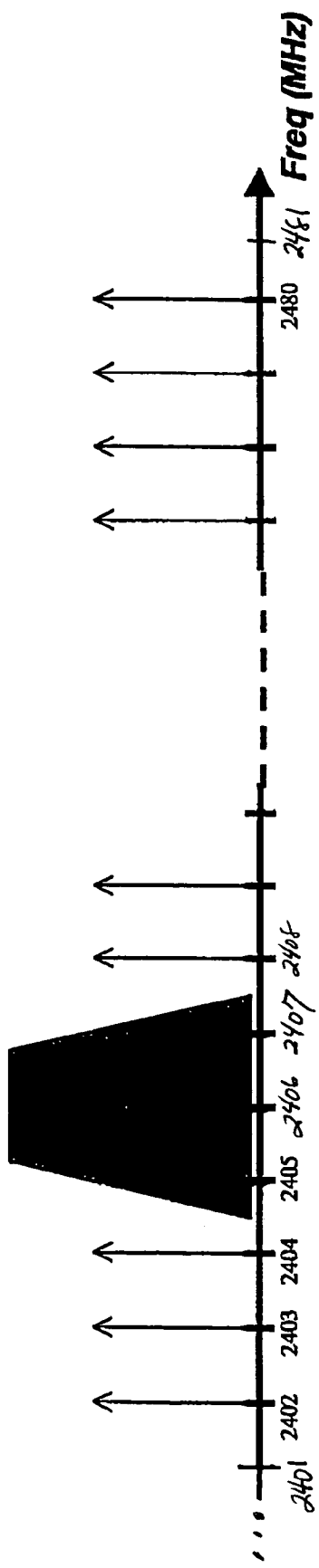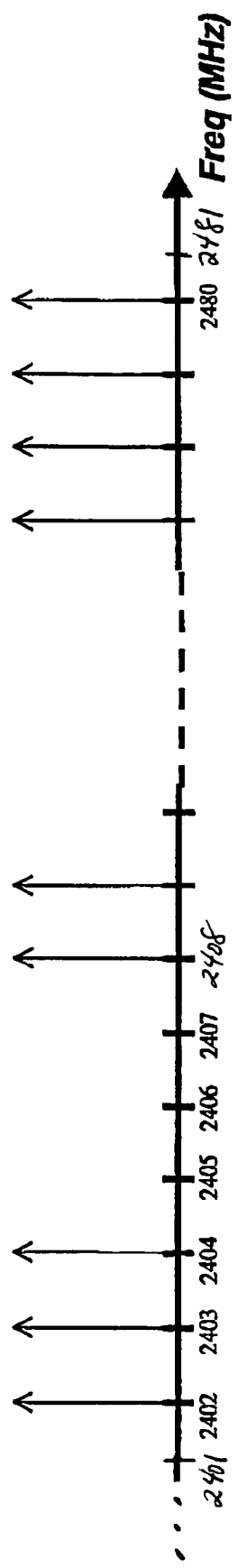
FIG. 3(a)
FIG. 3(b)

| HC 1 | HC 2 | HC 5 | HC 6 | HC 8 | HC 9 | HC 10 | HC 11 | HC 12 | HC 13 | HC 14 | HC 15 | ... | HC N1 |

INDEX: 1  2  3  4  5  6  7  8  9  10  11  12 ....  N2

FIG. 8

| INDEX | HOP CHANNEL | FORBIDDEN INDICATOR |
|---|---|---|
| 1 | HC 1 | 0 |
| 2 | HC 2 | 0 |
| 3 | HC 3 | 1 |
| 4 | HC 4 | 1 |
| 5 | HC 5 | 0 |
| 6 | HC 6 | 0 |
| 7 | HC 7 | 1 |
| 8 | HC 8 | 0 |
| 9 | HC 9 | 0 |
| ... | ... | ... |
| N1 | HC N1 | 0 |

FIG. 10

| INDEX | HOP CHANNEL | FORBIDDEN INDICATOR | GAP COUNT |
|---|---|---|---|
| 1 | HC 1 | 0 | 0 |
| 2 | HC 2 | 0 | 0 |
| 3 | HC 3 | 1 | 1 |
| 4 | HC 4 | 1 | 2 |
| 5 | HC 5 | 0 | 2 |
| 6 | HC 6 | 0 | 2 |
| 7 | HC 7 | 1 | 3 |
| 8 | HC 8 | 0 | 3 |
| 9 | HC 9 | 0 | 3 |
| ... | ... | ... | ... |
| N1 | HC N1 | 0 | 3 |

FIG. 12

FIG. 15(a) original FH SEQUENCE 32 2 62 43 5 6 71 28 9 30 11 10 55 14 5 63 ....

FIG. 15(b) REVISED FH SEQUENCE 32 2 73 43 6 6 71 28 9 30 11 10 55 14 25 63 ....

HOP SEQUENCE ADAPTATION IN A FREQUENCY-HOPPING COMMUNICATIONS SYSTEM

BACKGROUND

The invention relates to communication systems where transmitter and receiver make use of a hop sequence to remain in contact. More particularly, the invention relates to techniques for dynamically skipping certain hops of the hop sequence.

In the last several decades, progress in radio and Very Large Scale Integrated circuit (VLSI) technology has fostered widespread use of radio communications in consumer applications. Portable devices, such as mobile radios, can now be produced having acceptable cost, size and power consumption.

Although wireless technology is today focused mainly on voice communications (e.g., with respect to handheld radios), this field will likely expand in the near future to provide greater information flow to and from other types of nomadic devices and fixed devices. More specifically, it is likely that further advances in technology will provide very inexpensive radio equipment that can easily be integrated into many devices. This will reduce the number of cables currently used. For instance, radio communication can eliminate or reduce the number of cables used to connect master devices (e.g., personal computers) with their respective peripherals (e.g., printers).

The aforementioned radio communications will require an unlicensed band with sufficient capacity to allow for high data rate transmissions. A suitable band is the Industrial Scientific and Medical (ISM) band at 2.45 GHz, which is globally available. The band provides 83.5 MHz of radio spectrum.

To allow different radio networks to share the same radio medium without coordination, signal spreading is usually applied. In fact, the Federal Communications Commission (FCC) in the United States currently requires radio equipment operating in the 2.4 GHz band to apply some form of spectrum spreading technique when the transmit power exceeds about 0 dBm. Spread spectrum communication techniques, which have been around since the days of World War II, are of interest in today's commercial applications because they provide robustness against interference, and allow for multiple signals to occupy the same radio band at the same time.

Spreading can either be at the symbol level by applying direct-sequence (DS) spread spectrum techniques or at the channel level by applying frequency hopping (FH) spread spectrum techniques. In DS spread spectrum, the informational data stream to be transmitted is impressed upon a much higher rate data stream known as a signature sequence. Typically, the signature sequence data are binary, thereby providing a bit stream. One way to generate this signature sequence is with a pseudo-noise (PN) process that appears random, but can be replicated by an authorized receiver. The informational data stream and the high bit rate signature sequence stream are combined to generate a stream of so-called "chips" by multiplying the two bit streams together, assuming the binary values of the two bit streams are represented by +1 or −1. This combination of the higher bit rate signal with the lower bit rate data stream is called spreading the informational data stream signal. Each informational data stream or channel is allocated a unique signature sequence. At the receiver, the same unique signature sequence is used to recover the underlying informational data stream signal.

In frequency hopping systems, the spreading is achieved by transmitting the informational data stream over ever-changing radio frequencies. For each communication, the particular frequencies used by both the transmitter and receiver are determined by a predefined frequency hop sequence. The use of frequency hopping is attractive for the radio applications mentioned above because it more readily allows the use of cost effective radios.

A system called Bluetooth was recently introduced to provide pervasive connectivity especially between portable devices like mobile phones, laptops, personal digital assistants (PDAs), and other nomadic devices. This system applies frequency hopping to enable the construction of low-power, low-cost radios with a small footprint. The system supports both data and voice. The latter is optimized by applying fast frequency hopping in combination with a robust voice coding. The fast frequency hopping has a nominal rate of 800 hops per second (hops/s) through the entire 2.4 GHz ISM band. Devices based on the Bluetooth system concept can create so called piconets, which comprise a master device and one or more slave devices connected via the FH piconet channel. The FH sequence used for the piconet channel is completely determined by the address or identity of the device acting as the master. The system clock of the master device determines the phase in the hopping sequence (i.e., the designation of which one of the possible hops in the sequence is the "current" hop). In the Bluetooth system, each device has a free-running system clock. Each of the slave devices adds a corresponding time offset to its clock that enables it to become aligned with the clock of the master device. By using the master address to select the proper hopping sequence and by using the time offset to align to the master clock, each slave device keeps in hop synchrony to the master device; that is, master and slave devices remain in contact by hopping synchronously to the same hop frequency or hop carrier. For more details, reference is made to U.S. patent application Ser. No. 08/932,911, filed on Sep. 18, 1997 in the name of J. C. Haartsen and entitled "Frequency Hopping Piconets in an Uncoordinated Wireless Multi-user System," which is hereby incorporated herein by reference in its entirety.

The hop sequences used in the Bluetooth system are generated through a hop selection mechanism as described in U.S. patent application Ser. No. 08/950,068, filed on Oct. 24, 1997 in the name of J. C. Haartsen and entitled "Method and Apparatus for the Generation of Frequency Hopping Sequences," which is hereby incorporated herein by reference in its entirety. With this method, hop carriers are generated "on the fly". The mechanism has no inherent memory: address and clock information instantaneously determine the sequence and phase and therefore directly determine the desired hop carrier. The advantages of such a selection scheme are numerous. By changing address and clock, a device can jump from one FH piconet channel controlled by one address/clock combination to another piconet controlled by another address/clock combination. In this regard, reference is also made to the aforementioned application U.S. Ser. No. 08/932,911 describing FH piconets in an uncoordinated wireless multi-user system.

Radio communications intended for local connectivity between consumer applications require the use of a free and unlicensed band. As mentioned before, the ISM band at 2.45 GHz is a suitable band because it is available globally (although the specific part of the ISM band that may be used may differ per country or continent). Because no license is needed, more applications that use radios in these bands are emerging. Applications range from low-power baby monitors and garage door openers, to high-power radio frequency (RF) identification (ID) and Wireless Local Area Network (LAN) systems. For a wireless system such as Bluetooth, these other users are experienced as interferers. Frequency hopping provides a certain level of immunity against these interferers: when a Bluetooth connection lands on a hop carrier already in use by another radio system, it may experience interference for the duration of the hop dwell time. However, since the Bluetooth radio hops at a nominal rate of 800 hops/s, the dwell time is only 1.25 milliseconds (ms) after which the radio will hop to another channel. Since the range over which the radio is hopping is 80 MHz wide, the probability that the next hop is also occupied is rather small. Data protocols at a higher layer level can deal with distorted information, for example by applying a retransmission scheme or an error-correction scheme. However, performance can be improved if the FH channel can avoid those hop frequencies associated with heavy interference. In particular, if there are narrowband interference sources ("jammers") that continuously occupy one or more hop channels (so-called continuous-wave or CW jammers), the throughput of the piconet channel can especially be improved if both the hopping transmitter and the receiver can skip the interfered hop frequencies and instead hop to a clean hop carrier. Skipping certain hops may also be beneficial in those instances in which a certain band in the spectrum is reserved for high-rate links, which do not tolerate interference. Frequency hopping Bluetooth devices within range of such high-rate links could prioritize these links by avoiding hopping into the reserved band. An advanced system that makes use of both a hopping channel for low-rate services and a dynamically selected semi-fixed channel for high-rate services is described in U.S. patent application Ser. No. 09/385,024, filed on Aug. 30, 1999 in the name of J. C. Haartsen and entitled "Resource Management in Uncoordinated Frequency Hopping System", which is hereby incorporated herein by reference in its entirety.

Another situation in which adapting the hop sequence may be beneficial is the one in which a fast hopper and a slow hopper share the same spectrum. The fast hopper may then remove the hop carrier out of his FH sequence that corresponds to the hop carrier the slow hopper currently occupies. When the slow hopper hops to the next hop channel, the fast hopper must adapt its FH sequence.

Skipping certain hop frequencies means changing the hop sequence such that one or more hop frequencies are removed from the sequence. However, hop removal must be adaptable because the interference cannot be predicted (the band is unlicensed and any radio can make use of it) and may vary over time (for example, the band to avoid may be based on dynamic channel selection). That is, the hop sequences should be capable of dynamic adaptation in order to avoid one or more hop frequencies.

In conventional systems like FH systems based on the IEEE 802.11 Wireless LAN (WLAN) standard, a restricted number of hopping sequences has been defined. In each sequence, each hop carrier is only visited once. Consequently, with 79 hop frequencies defined in this standard, the sequence length is only 79. These sequences are fixed, limited in size, limited in number, and can simply be stored as a list in a Read Only Memory (ROM) or other nonvolatile memory. When a new channel is established, a sequence is selected that preferably interferes as little as possible with already established hopping channels in the same or adjacent areas. Since the sequences are stored, off-line processing can simply be carried out for example to remove one or more frequencies from the sequence.

In contrast, there are a large number of possible FH sequences in the Bluetooth system. The sequence selected is based on 28 bits in the master identity. As a result, $2^{28}$ (i.e., 2 raised to the 28th power) or 268,435,456 different hop sequences are defined. In addition, the length of each sequence is determined by the master clock which counts from 0 to $2^{27}-1$ at a rate of 1600 increments per second. The clock value wraps around back to zero after about 23.3 hours.

The number of possible sequences and the size of each sequence make it impossible to store the Bluetooth FH sequences and process them off-line. Instead, a selection mechanism is used as described in the above-referenced U.S. patent application Ser. No. 08/950,068. Adapting the FH sequences to avoid certain hop frequencies is not trivial, especially if there is also a requirement to preserve the feature whereby switching between different FH channels is performed by merely replacing the address and clock information.

Conventional techniques are inadequate for this purpose. For example, U.S. Pat. No. 5,848,095, which issued to Deutsch on Dec. 8, 1998, discloses a system and method for adaptive hopping, whereby frequencies are selected for substitution in a frequency hopping system by reference to time slots. In the exemplary embodiment, all units have four frequency hopping sequences allocated to them, designated A, B, C and D. A unit may, for example, be in a talking mode in which it uses group B to hop from channels B1, B2, B3, and so on. If, for example, channel B3 is found to interfere, the channel would be "marked" as bad, and channel C3 would substitute for channel B3. The result would be a hopping sequence consisting of B1, B2, C3, B4, B5 and so on. This strategy has a number of drawbacks. To begin with, it requires changes to the hop sequence generator. Moreover, because the strategy involves selecting a substitute channel from another hopping sequence, there is no guarantee that the selected substitute will be a suitable channel. For example, in the above-illustrated case, there is no certainty that the substitute channel C3 is usable. In such cases, this document describes making yet another selection from another group (e.g., selecting channel D3 from group D) and repeating this operation until a suitable substitute channel is selected. However, this strategy can't guarantee that an acceptable substitute channel will always be found without prestoring an overwhelming number of hopping sequences.

U.S. Pat. No. 5,515,369, which issued to Flammer, III et al. on May 7, 1996 discloses a method for frequency sharing and frequency punchout in a frequency hopping communications network. Bad channels are eliminated by means of a punchout mask. Having eliminated bad channels, a seed value is used to generate a randomly ordered channel hopping sequence from the remaining good channels.

U.S. Pat. No. 5,619,493, which issued to Ritz et al. on Apr. 8, 1997, discloses a spread-spectrum frequency-hopping radio telephone system with voice activation. A set of N carrier frequencies are reused in adjacent communications sites to provide more than N minimally cross-correlated frequency-hopping communication channels. A second hopping sequence is derived from a first hopping sequence by selecting frequencies from the first set in their sequential order, skipping a first decimation number of frequencies in the sequence, and repeating this process on the remaining frequencies in the first sequence in their remaining order. Other hop sequences are similarly derived by using different decimation numbers.

U.S. Pat. No. 5,809,059, which issued to Souissi et al. on Sep. 15, 1998, discloses a method and apparatus for spread spectrum channel assignment. The technique includes computing average noise and interference levels for different sequences of channels, and then selecting that one of the sequences of channels having the lowest average noise and interference level for a next transmission of information.

U.S. Pat. No. 4,606,040, which issued to David et al. on Aug. 12, 1986, discloses a transmitting-receiving station for a system for transmitting data by frequency hopping. In order to facilitate synchronization between two units when one is in a standby mode, a code generator defines the use of a plurality of channels in accordance with a so-called high-speed skip law for a transmitting-receiving station in either of the transmitting or receiving modes, and in accordance with a so-called low-speed skip law for a transmitting-receiving station in the stand-by mode. The high-speed skip law consists of the use of each of the channels during a time $T_p$, while the low-speed skip law governs the changes of the listening channels employed during $N \times T_p$, each corresponding to a center channel of a sequence of N channels of the high-speed skip law.

U.S. Pat. No. 4,023,103, which issued to Malm on May 10, 1977, discloses a synchronizer for synchronizing a frequency hopping receiver with a companion frequency hopping transmitter. The synchronizer includes an electronic clock that provides timing pulses for activating a pseudo-random sequence generator at the frequency hopping rate, and means that cause the clock to skip one activating pulse every N successive frequency hopping periods, until a frequency hopping local signal and a frequency hopping signal from the companion receiver are out of sync by less than one frequency hopping period.

Each of the above-cited documents discloses a technique for skipping certain hops that has drawbacks, including the fact that each requires changes to the hop sequence generator.

There is therefore a need for methods and apparatuses for removing specific hop frequencies from an arbitrary hopping sequence. There is also a need for accomplishing this without requiring off-line processing. It is also desirable to be able to adapt hop sequences dynamically, and to apply this adaptation to any existing hop selection scheme or existing hop sequence.

SUMMARY

In accordance with the present invention, a hop channel is selected for use in a channel hopping communication system that includes a sequence of hop channels, wherein the sequence comprises a set of forbidden hop channels and a remaining set of allowable hop channels. In accordance with one aspect of the invention, selection involves selecting a hop channel from the sequence as a function of a present phase. If the selected hop channel is an allowable hop channel, then the selected hop channel is used for communication during the present phase. If the selected hop channel is a forbidden hop channel, then a time-varying parameter is used to select a substitute hop channel from the set of allowable hop channels. The substitute hop channel is then used for communication during the present phase. With this strategy, the resultant hopping sequence is identical to the original hopping sequence whenever the original sequence calls for an allowable hop channel. In all other cases, a substitute hop channel is dynamically selected from the set of allowable hop channels.

In another aspect of the invention, the time-varying parameter may be a clock value. In some embodiments, the time-varying parameter and the present phase may be derived from a same clock value. In alternative embodiments, the time-varying parameter may be a random value or a pseudo-random value.

In yet another aspect of the invention, hop selection further comprises forming a sequence of allowable hop channels from the set of allowable hop channels. In this case, the operation of using a time-varying parameter to select a substitute hop channel from the set of allowable hop channels comprises forming an index value from the time-varying parameter; using the index value to select one of the allowable hop channels from the sequence of allowable hop channels; and using the selected allowable hop channel as the substitute hop channel.

In still another aspect of the invention, the operation of forming the index value from the time-varying parameter comprises determining the expression:

index value=mod(time-varying parameter, N2)+ BASE VALUE, where mod (j,k) denotes j modulo k, N2 is the number of allowable hop channels in the sequence of allowable chop channels and BASE VALUE represents an index value of the first allowable hop channel in the sequence of allowable hop channels.

In yet another aspect of the invention, the operation of using a time-varying parameter to select a substitute hop channel from the set of allowable hop channels comprises determining an index value, i, as a function of the time-varying parameter; designating one of the allowable hop channels in the sequence of hop channels as a first hop channel; starting at the first hop channel, processing the sequence of hop channels to determine an ith allowable hop channel in the sequence of hop channels; and selecting the ith allowable hop channel for use as the substitute hop channel.

In some embodiments, the first hop channel may be the first hop channel in the sequence of hop channels. In alternative embodiments, the first hop channel may be a first hop channel after a last forbidden hop channel in the sequence of hop channels. In this case, the operation of processing the sequence of hop channels to determine an ith allowable hop channel in the sequence of hop channels wraps around to the start of the sequence of hop channels when i is greater than the number of hop channels following the last forbidden hop channel in the sequence of hop channels.

In still another aspect of the invention, the operation of processing the sequence of hop channels to determine an ith allowable hop channel in the sequence of hop channels may alternatively comprise, starting at the first hop channel and continuing with each successive hop channel in the sequence of hop channels, determining whether the hop channel is an allowable hop channel; and stopping when an ith allowable hop channel has been identified in the sequence of hop channels.

In yet another aspect of the invention, the technique further comprises determining a gap count for each of the hop channels in the sequence of hop channels, wherein the gap count represents how many forbidden hop channels are in the sequence of hop channels from the first hop channel up to and including said each of the hop channels. In these embodiments, the operation of processing the sequence of hop channels to determine an ith allowable hop channel in the sequence of hop channels comprises (a) using the index value plus a previous gap count to select one of the hop channels from the sequence of hop channels; and (b) using the selected hop channel as the substitute hop channel if the selected hop channel is associated with a present gap count that is equal to the previous gap count, otherwise setting the previous gap count equal to the present gap count and repeating operations (a) and (b).

BRIEF DESCRIPTION OF THE DRAWINGS

The objects and advantages of the invention will be understood by reading the following detailed description in conjunction with the drawings in which:

FIGS. 2(a) and 2(b) are graphs depicting examples of hop carrier definitions in the ISM band in case of three individual narrowband interferers;

FIGS. 3(a) and 3(b) are graphs depicting examples of hop carrier definitions in the ISM band in case of a single wideband interferer;

FIG. 7 is a diagram of a hop sequence having a total of N1 hop channels;

FIG. 8 is a block diagram illustrating a set of N2 remaining allowable hop channels in accordance with one aspect of the invention;

FIG. 10 is a diagram of a table that may be stored in a memory for use in determining a substitute hop channel in accordance with an embodiment of the invention;

FIG. 12 is a diagram of a table that may be stored in a memory for use in determining a substitute hop channel in accordance with an alternative embodiment of the invention;

FIGS. 15(a) and 15(b) depict a comparison between an original and a corresponding revised hopping scheme, in accordance with the invention.

DETAILED DESCRIPTION

Figure 1:
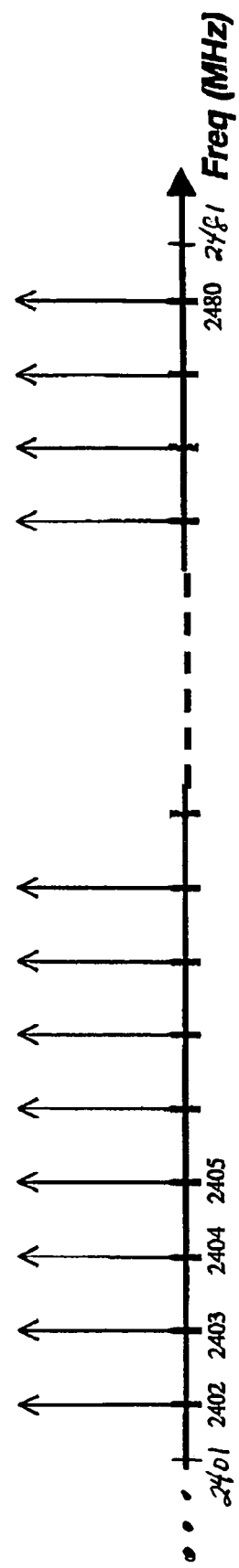
FIG. 1 is a graph depicting an exemplary hop carrier definition in the ISM band.

The various features of the invention will now be described with respect to the figures, in which like parts are identified with the same reference characters.

The techniques described herein achieve the skipping of certain hops in a hop sequence without having to change the hop sequence generator. Instead, a transformation operation is performed in which a "forbidden" hop serves as the basis for determining an "allowed" hop. For example, if the hop selection mechanism visits a "forbidden" hop, an offset may be temporarily added to the phase such that an allowed hop is instead selected. The offset is only applied when a forbidden hop is selected. When an allowed hop is selected, no adjustment is made. As used throughout this disclosure, the term "forbidden" refers to a hop channel that should be avoided during communication for any of a number of reasons. For example, the detection of a substantial amount of interference on a hop channel may make it desirable to avoid use of that hop channel, at least until the interference subsides. It may also be the case that one or more hop channels are known to be "reserved" for use by another system, so that a present system can avoid experiencing interference by avoiding these channels. Similarly, a nearby system may be required to provide a high priority/high quality service via one or more hop channels. In this case, a present system can avoid causing interference on these channels (and thereby avoid disturbing the nearby system) by avoiding the use of these hop channels. These are but mere examples of reasons why one or more hop channels may be denoted as "forbidden" hop channels. Those having ordinary skill in the art will recognize that other reasons exist as well, and all such reasons are considered within the scope of the invention. It will also be recognized that the designation of a hop channel as alternatively "forbidden" or "allowed" need not be static, but can instead be determined and changed dynamically. For example, an allowed hop channel may become "forbidden" in response to the detection of interference on that hop channel, and may later be again designated as "allowed" when it is detected that the interference has sufficiently abated.

In another aspect of the invention, for each phase value associated with a forbidden hop, the transformation of the forbidden hop into an allowed hop may be evenly distributed over the allowed hops by using a time-varying parameter as the basis for making a selection, such as using a time-varying parameter to form the offset amount described above. For example, selection (e.g., via the offset amount) may be varied as a function of the system clock. Alternatively, selection may be made on the basis of a random or pseudo-random parameter. As a result, the randomness that characterizes the initial FH sequence (which uses all hop frequencies) is preserved in the final, revised FH sequence (which has the same sequence length as the initial FH sequence, but which uses only the allowed hop frequencies). In addition, each hop carrier in the revised FH sequence may be visited with equal probability. Because of the feature whereby allowed hops continue to be used during their originally-scheduled phase values, the original FH sequence is reflected in the revised FH sequence: Only during phase values associated with forbidden hops are substitute (allowed) hops utilized. This allows slave units participating on the hopping channel to remain synchronized even if once in a while, they miss a hop (i.e., when the forbidden hop is replaced by an allowed hop).

These and other aspects of the invention will now be further described in greater detail.

In general a hop selection scheme includes three components: a fixed set of carriers to hop over (often referred to herein as "hop channels"), a given order or sequence of the carriers that is followed as hopping progresses, and a phase that points to a particular place in the hop sequence. As the phase progresses, the system hops from one hop channel in the FH sequence to the next according to the defined sequence, thereby operating at each of the carriers at one time or another. Most FH systems that use the ISM band at 2.45 GHz have a carrier definition as shown in FIG. 1. The 83.5 MHz available radio spectrum at this ISM band is divided into 79 carriers equally spaced by 1 MHz. The first carrier is at 2402 MHz and the last carrier is at 2480 MHz. No hops are defined at the edges of the ISM band in order to satisfy the requirements on out-of-band spurious signals using relaxed radio transmitter design.

These 79 carriers form the set of carriers that FH systems such as IEEE 802.11 and Bluetooth hop over. The sequence determines the order in which the hops are utilized (often referred to herein as "visited"). To allow fair access to this ISM band, regulatory bodies like the FCC in the U.S. and the Conference of European Posts and Telecommunications (CEPT) in Europe have defined certain rules to which FH radios using the ISM band have to conform. For example, the FCC requires that at least 75 hop carriers be used, and that, on average, each hop carrier be visited with equal probability. In addition, in a 30 second period, the accumulated dwell time on a single hop should not be greater than 400 ms. In the IEEE 802.11 standard, the sequence length is exactly 79 and each hop carrier is visited only once in the sequence. The sequence has a repetition interval of 79 hops.

The sequence does not have to have a length identical to the number of hop carriers in order to satisfy the FCC rules, however. For example, in Bluetooth, the sequence length is very long, consisting of 2^27 hops. Still, each hop carrier is visited with equal probability and in a 30 second period, the accumulated dwell time does not exceed 400 ms.

If one or more jammers are operating in the ISM band and are located in the vicinity of a FH system, it is beneficial for the FH system to avoid the hop carriers that are occupied by the jammers. For example, consider the frequency utilization graph shown in FIG. 2(a), which illustrates the case of three narrowband jammers occupying the ISM band at 2403 MHz, 2406 MHz and 2478 MHz, respectively. Whenever the FH system lands on one of these occupied frequencies, it will experience interference. The corresponding jammer may similarly experience interference from the FH system.

The situation can be improved by removing the occupied hop carriers from the set of carriers that are utilized by the FH sequence, as illustrated in FIG. 2(b).

As another example, consider FIG. 3(a), which is a frequency utilization graph depicting the case in which a wideband jammer occupies the consecutive carriers at 2405 MHz, 2406 MHz and 2407 MHz. To improve this situation, the carrier set may be redefined to exclude the occupied carriers ranging from 2405 to 2407 MHz, as illustrated in the frequency utilization graph depicted in FIG. 3(b).

A hopping unit in a FH system could, of course, effect the frequency utilization graphs like those depicted in FIGS. 2(b) and 3(b) by refraining from transmission when landing on a jammed hop. However, it is preferable to hop around the jammed carriers, that is, for the hopper to continue operating while avoiding the jammed carriers. This can be accomplished by either changing the FH sequence to remove the occupied carrier(s), or by using a transformation scheme in which the radio units in the FH system select a different, clean hop carrier whenever they are supposed to land on an occupied carrier. The latter method can be applied more generally and is preferred when no off-line sequence processing can be carried out.

A number of requirements have to be taken into account when selecting a different hop carrier when the carrier specified by the FH sequence and phase is occupied. First, the FCC does not allow the avoidance of more than 4 carriers, since 79−4=75 is the minimum number of carriers that must be hopped over. Furthermore, the replacement of the occupied carrier by a clean carrier must preserve the random properties of the FH sequence. If one were to use a fixed replacement of occupied carrier A by a clean carrier K, then K would be visited twice as often as the carriers not used for replacement, and this would violate the uniform probability requirement.

Figure 4B:
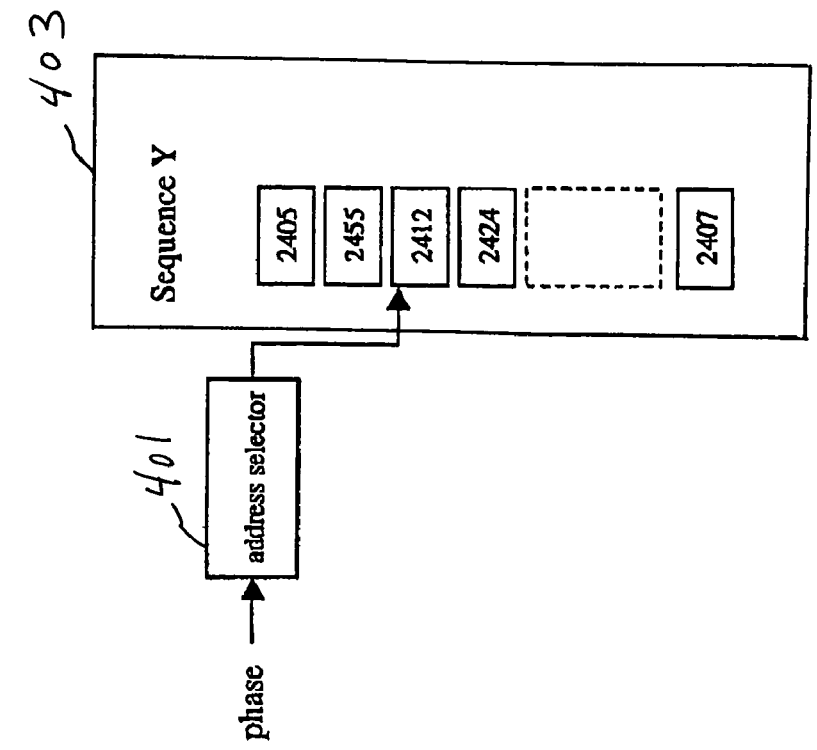
FIGS. 4(a) and 4(b) illustrate a hop carrier selection technique that utilizes a pre-stored sequence.
Figure 4A:
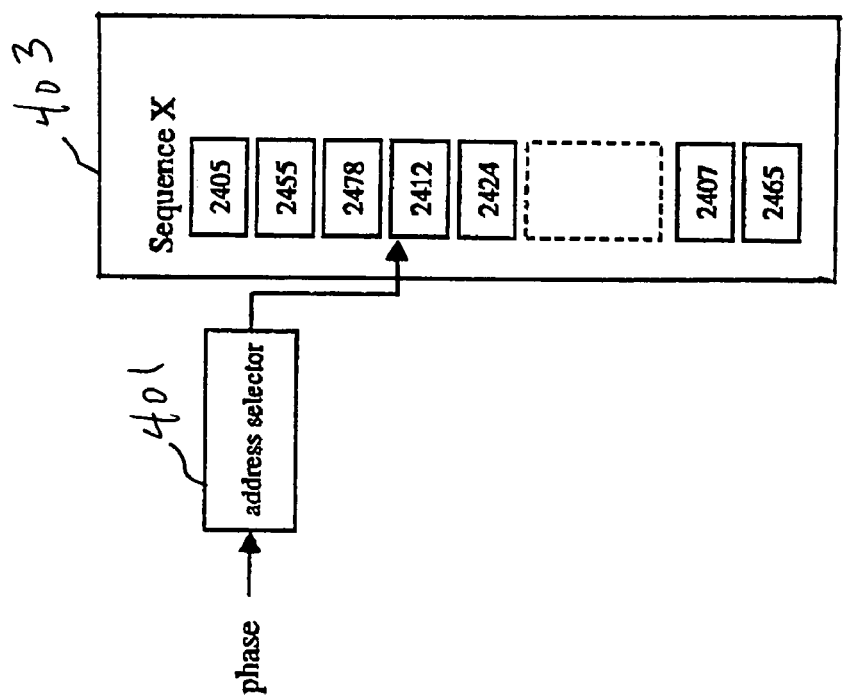

In conventional FH systems, the sequences are pre-stored. At the time of connection setup, one of the sequences, X, is selected which designates both the particular set of frequencies to be used and the ordering of those frequencies. During operation, the phase value determines the hop position of the connection within the sequence. The rate of change of the phase value determines the hop rate. A conventional hop selection scheme is shown in FIGS. 4(a) and 4(b). In FIG. 4(a), the original sequence X is stored in an addressable memory 403. In operation, an address selector 401 receives a phase value, and converts this into an address for retrieving the frequency to be used for a next hop.

In FIG. 4(b), another sequence, Y, is stored in the memory 403. The sequence Y is similar to the original sequence X, but has one or more carriers removed. (In the example of FIG. 4(b), the hops at 2465 MHz and 2478 MHz have been removed.) In operation, the address selector uses the input phase value to select a next hop frequency from the reduced set of hop frequencies. In this manner, hop avoidance can easily be accomplished.

The conventional technique for hop avoidance illustrated in FIGS. 4(a) and 4(b) suffers from several drawbacks. First, the removal of the forbidden hops from the original sequence X results in a sequence Y that is shorter than the original sequence. This has the effect of advancing the phase of all hops subsequent to the removed hop, so that older equipment, not designed to skip over forbidden hops, will not be able to remain synchronized with newer equipment having this feature.

Figure 5:
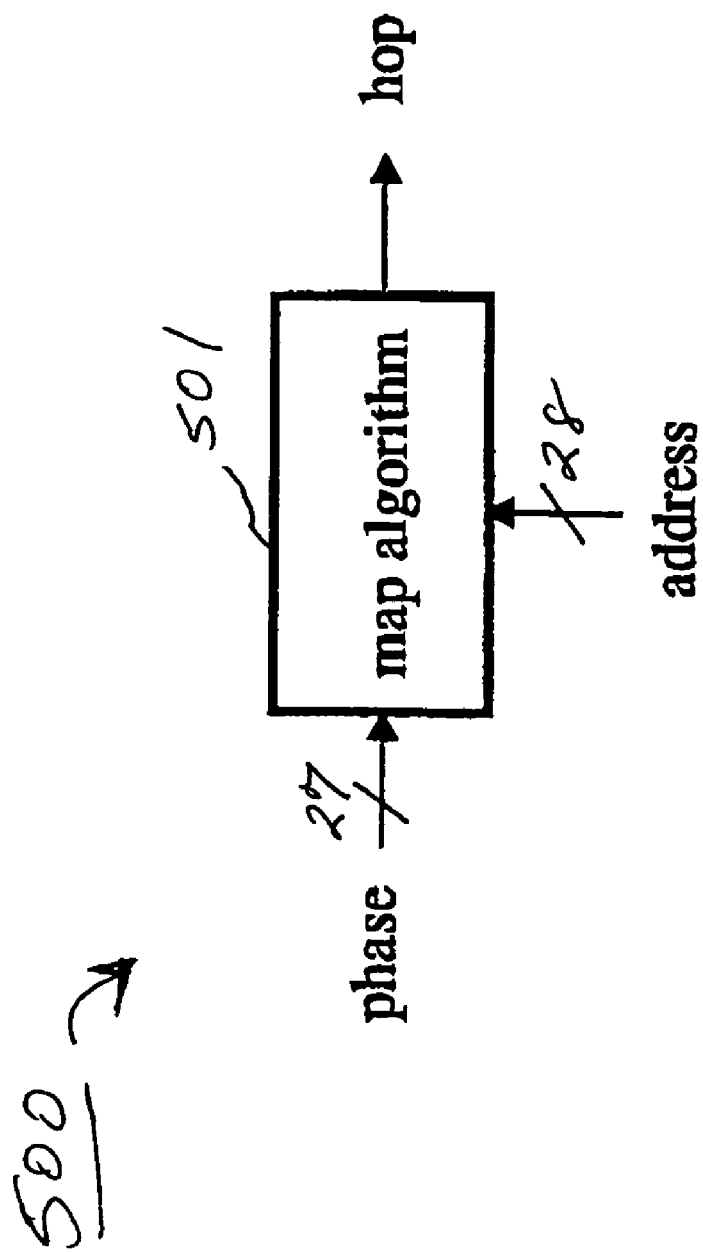
FIG. 5 is a block diagram of an exemplary hop carrier selector for the case of on-the-fly sequence generation.

Another drawback of the conventional technique for hop avoidance is the fact that it cannot be applied in a system in which the number of sequences and the size of each sequence exclude the application of pre-storage. For example, in the Bluetooth system, the hop selection is based on a hop generator such as the hop generator 500 depicted in FIG. 5. In the hop generator 500, a 28-bit address determines the sequence and a 27-bit clock determines the phase within that sequence. A dedicated mapping algorithm 501 is used which maps the address and current clock onto a hop carrier. The mapping may be based on bit-EXOR, bit-addition, and bit-permutation operations as described in the above-referenced U.S. patent application Ser. No. 08/950,068. In this selection scheme, it is rather cumbersome, if not impossible, to change the sequence in order to skip over certain hop carriers.

Figure 6:
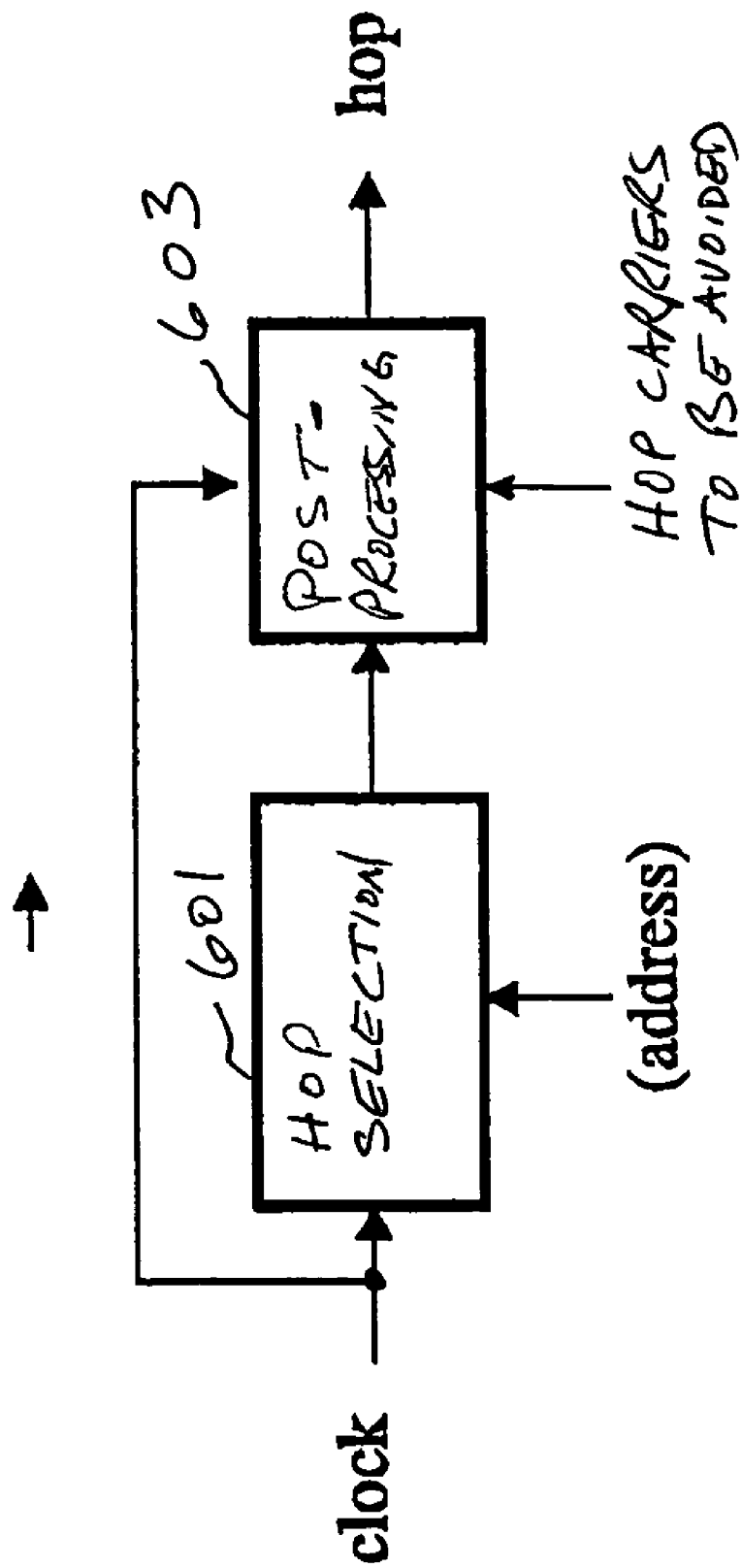
FIG. 6 is a block diagram illustrating the general concept of a hop avoidance scheme in accordance with the invention.

In accordance with one aspect of the invention, a post-processing operation is provided that can be applied to any existing hop selection scheme and that will dynamically replace certain pre-defined hop carriers with other hop carriers. A block diagram of an exemplary embodiment of the scheme is shown in FIG. 6. In this and all other block diagrams presented here, the functions represented by the various blocks may be embodied in any of a variety of forms, including but not limited to hard-wired circuits, or a processor executing a suitable set of program instructions stored on a computer readable storage medium such as a random access memory (RAM), read only memory (ROM), magnetic storage medium (such as magnetic tape, disk or diskette) or optical storage medium (such as compact disk (CD) ROM). The invention may be embodied in any one or combination of these forms, including but not limited to a computer readable storage medium having the suitable set or program instructions stored thereon. As used herein, the term "logic" shall be used to refer to any and all such forms of embodiment, or portions of such forms of embodiment.

Returning now to FIG. 6, an original hop selection function 601, based on pre-stored sequences as in IEEE 802.11 or on a dedicated selection algorithm as in Bluetooth, generates a present hop from a phase value and a sequence selector. The phase value may be derived from a clock value, and the sequence selector may be derived from a device identity or address, such as that utilized in Bluetooth systems. The output from the original hop selection function 601 is supplied to a post-processing function 603, which additionally receives as input the phase and the set of hop carriers, S, to be avoided. Both the transmitter and receiver preferably have the same input parameters to this selection operation, so that at any moment in time, the same hop will be selected and the radios will remain in synchrony.

When allowable hops are supplied at its input, the post-processing function 603 passes these to its output. However, when a hop to be avoided is supplied by the hop selection function 601, the post-processing function 603 transforms this into an allowable hop. The following is an example of an algorithm for performing this transformation. First, the hop selection supplied by the hop selection function 601 is compared with the set of hops to be avoided (S). If the supplied hop is not in the set S, the post-processing function 603 just passes the hop without alteration. In this case, the post-processing function 603 is transparent. Thus, to the extent possible, the original hop sequence is retained in its original form (i.e., allowable hops are used when they were originally scheduled to be used).

However, if the original hop selection function 601 supplies a hop that is an element in S, then the post-processing function 603 maps this hop to a different hop that is outside the set of S, but which is still within the set of hop carriers defined for the system, for example one of the 79 carriers in the ISM band. This mapping is controlled by the phase, which as mentioned above is also supplied to the post-processing function 603. Because the phase changes continuously, any forbidden hop A will not always be mapped to the same allowable hop K. Instead, forbidden hop A is mapped onto each of the allowable hops with equal probability. So on average, hop A is mapped uniformly over the remaining, allowable hops. The same technique is applied for all other forbidden hops. As a result, the allowable hops are still visited with equal probability since both the original selection and the mapping for forbidden hops make equal use of all allowable hops.

Figure 7:
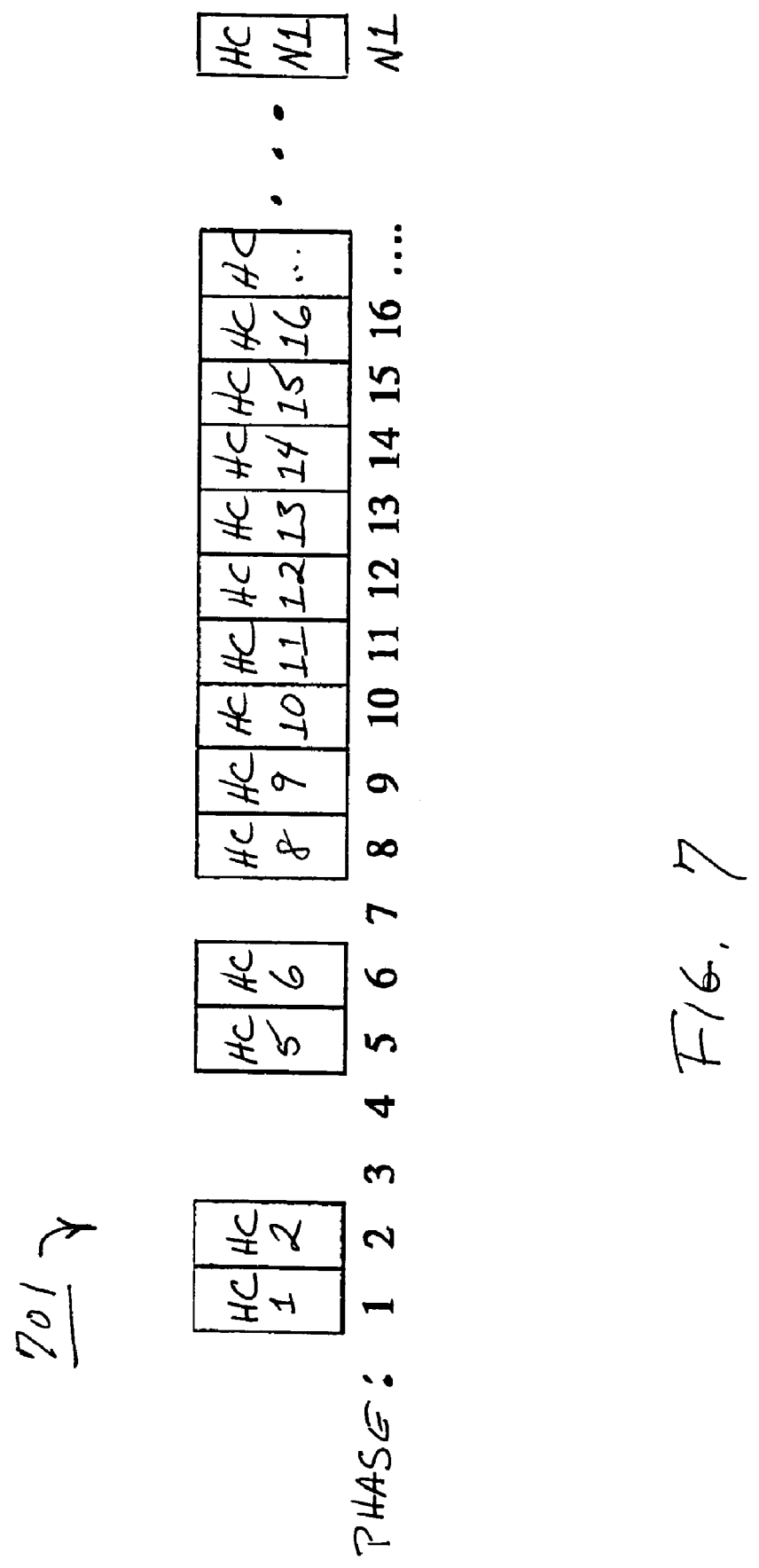

FIG. 7 is a diagram of a hop sequence 701 having a total of N1 hop channels (HC). In the exemplary hop sequence 701, the hop channels associated with phase values of 3, 4 and 7 (referred to herein as hop channels 3, 4 and 7) are forbidden, and are therefore no longer included within the set of allowable hop channels. The set of N2 remaining allowable hop channels 801 is illustrated in FIG. 8. In this example, N2=N1−3 because three forbidden hop channels (namely HC 3, HC4 and HC7) have been removed. In accordance with one aspect of the invention, whenever the current phase value is associated with one of the forbidden hop channels, a time-varying parameter, such as a clock value or a value produced by a random (or pseudo-random) number generator, is used to select a substitute hop channel from the set of remaining allowable hop channels. The substitute hop channel is then used for the communication during this phase. However, whenever the current phase value is associated with one of the allowable hop channels, that hop channel is used for the communication during this phase. The time-varying parameter and the phase may be derived from the same source, for example, a system clock. In fact, they may be one and the same parameter. However, in alternative embodiments, the time-varying parameter may be different for different occurrences of a given phase value (e.g., in embodiments in which the phase and time-varying parameter are not derived from the same source). In such embodiments, for a given phase value requiring substitution of an allowed hop channel for a forbidden hop channel, separate occurrences of the same phase value will result in different allowed hop channels being selected for use as substitute hop channels. In all embodiments, initialization of the time-varying parameter and its updating should be synchronized between all participants in a communications link so that the adaptation of the hopping sequence will be identical for all such participants.

There are a number of ways in which the above-described strategies can be implemented. These will now be described.

Figure 9:
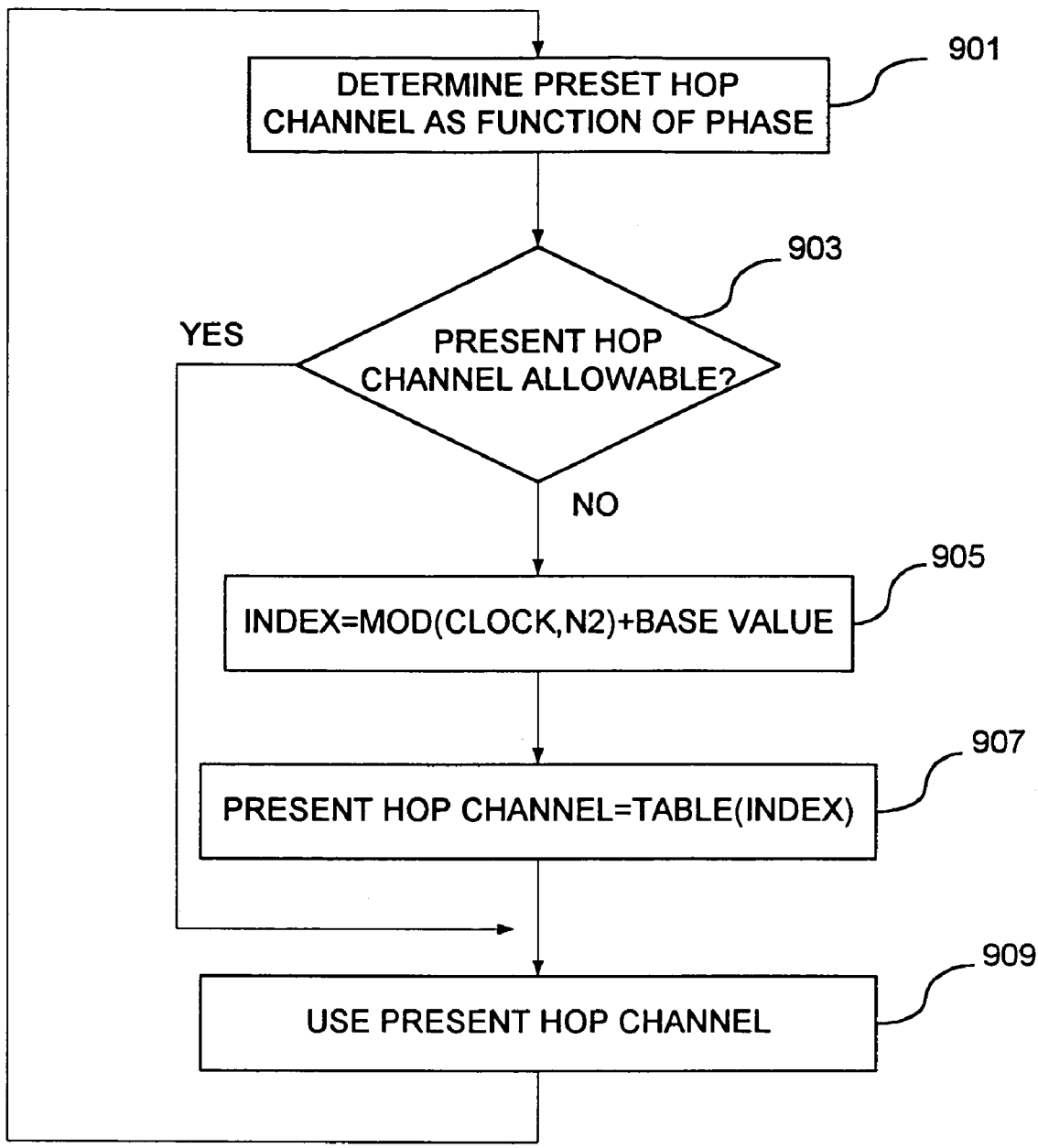
FIG. 9 is a flow chart of operations in accordance with one embodiment of the invention.

In one embodiment, the set of allowable hop channels 801 may be stored as a table in an addressable computer readable storage medium, such as a RAM (not shown). During operation, as illustrated by the flow chart of FIG. 9, the post-processing 603 function is transparent so long as the present phase is associated with an allowable hop channel (steps 901, 903 and 909). However, whenever the present phase is associated with a forbidden hop ("NO" branch out of decision block 903), an index into the table of allowable hop channels 801 is generated in accordance with:

$$\text{index} = \text{mod}(\text{CLOCK}, N2) + \text{BASE VALUE}, \quad (1)$$

where mod (j,k) means j modulo k, CLOCK represents a present clock value in the range from 0 to a maximum value that is preferably greater than or equal to N2−1 (step 905), and BASE VALUE represents the index associated with the first hop channel in the table 801. In this example, the first hop channel in the table 801 has an index of 1, so BASE VALUE is set to 1 as well. Of course in other embodiments, the BASE VALUE could be set to different values. Also in other embodiments, the clock value need not be used directly. Instead, any time-varying parameter capable of assuming values in the range from 0 to a maximum value that is preferably greater than or equal to N2−1 may be used. The generated index is used to address an entry in the table 801 and retrieve a substitute hop channel (step 907), which is then used for communication during this phase (step 909). It will be recognized that if the time-varying parameter has a maximum value less than N2−1, then certain hop channels will be selected for use as substitute hop channels more frequently than others, thereby violating any randomness requirements that may be mandated by regulation. It is therefore preferred that the time-varying parameter be capable of taking on a maximum value at least equal to N2−1. When the time-varying parameter is, for example, a clock value, it is preferred that it be capable of taking on a maximum value well in excess of N2−1 in order to increase the degree of randomness at which hop channels are selected for use as substitute hop channels. Of course, alternative embodiments can be constructed that use random (or pseudo-random) number generators instead of a clock value to generate the time-varying parameter.

Since, in this exemplary embodiment, the BASE VALUE is set to point to the start of the table 801, the formula presented in Equation (1) will not generate an index that points beyond the last entry in the table 801. However, it is also possible to construct embodiments in which the BASE VALUE points to an entry other than the first one. In such cases, Equation (1) would have to be modified to perform an additional modulo N2 calculation to keep the final index value within the range of actual table entries.

In alternative embodiments, it is possible to avoid having to store a table of allowable hop channels separate and apart from the stored original sequence. A first of these embodiments will now be described with reference to FIGS. 10 and 11. Referring first to FIG. 10, this is a diagram of a table 1001 that may be stored in a memory. The table has N1 rows, in correspondence with the N1 hop channels that make up an original hop sequence. Each row has two entries: a hop channel entry 1003 and a forbidden indicator 1005. The hop channel entry 1003 stores a hop channel that is originally planned to be used when the phase corresponds to that hop channel's row number. The forbidden indicator 1005 stored in each row may be a binary value that indicates whether the hop channel (stored in the same row as the forbidden indicator) is forbidden. In the illustrated embodiment, a value of "0" is used to denote that the hop channel is not forbidden (i.e., that it is allowable), while a "1" is used to denote that the hop channel is forbidden.

Figure 11:
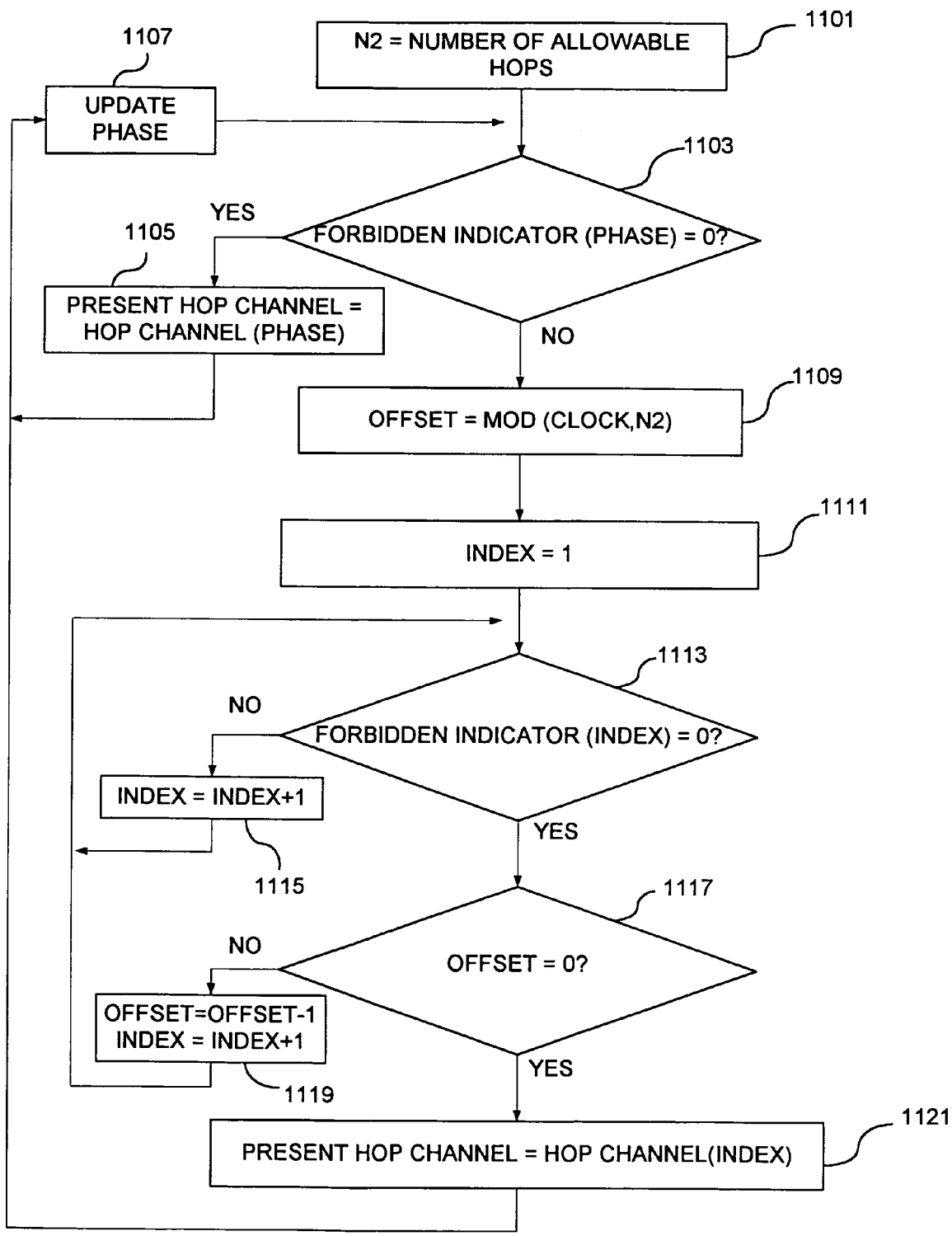
FIG. 11 is a flow chart of operations for determining a suitable hop channel in accordance with one embodiment of the invention.

The operation of this embodiment will now be described with reference to the flow chart of FIG. 11. The routine begins by setting the value of N2 equal to the number of allowable hops in the sequence (step 1101). Next, the present phase value is used as an index into the forbidden indicator column 1005 of the table 1001, and the value at this location is retrieved. If the retrieved forbidden indicator 1005 indicates that the corresponding hop channel is allowable (e.g., forbidden indicator (phase)=0), then the present hop channel is the corresponding hop channel (step 1105). After using the present hop channel for communication, the phase is then updated (step 1107), and the routine repeats, beginning at decision block 1103. It should be noted that in some embodiments, the phase is updated automatically by hardware, so that in such embodiments, no particular program instructions are required for this step.

Returning to decision block 1103, if the retrieved forbidden indicator 1005 indicates that the corresponding hop channel is not allowable ("NO" path out of decision block 1103), then a substitute hop channel is dynamically determined. This is accomplished by first determining an OFFSET in accordance with:

$$\text{OFFSET} = \text{mod}(\text{CLOCK}, N2), \qquad (2)$$

where the CLOCK represents a present clock value in the range from 0 to a maximum value that is preferably greater than or equal to N2−1 (step 1109). Of course in other embodiments, the clock value need not be used directly. Instead, any time-varying parameter capable of assuming values in the range from 0 to a maximum value that is preferably greater than or equal to N2−1 may be used. It will be recognized that if the time-varying parameter has a maximum value less than N2−1, then certain hop channels will be selected for use as substitute hop channels more frequently than others, thereby violating any randomness requirements that may be mandated by regulation. It is therefore preferred that the time-varying parameter be capable of taking on a maximum value at least equal to N2−1. When the time-varying parameter is, for example, a clock value, it is preferred that it be capable of taking on a maximum value well in excess of N2−1 in order to increase the randomness at which hop channels are selected for use as substitute hop channels. Of course, alternative embodiments can be constructed that use random (or pseudo-random) number generators instead of a clock value to generate the time-varying parameter.

Next, an index variable is set to an initial value, which in this exemplary embodiment is a value of 1 (step 1111). This index variable is used as an address for retrieving a forbidden indicator 1005 from the table. If the retrieved forbidden indicator indicates that the corresponding hop channel is forbidden ("NO" path out of decision block 1113), then this entry is skipped by incrementing the index variable (step 1115). Execution then returns to decision block 1113.

If the retrieved forbidden indicator indicates that the corresponding hop channel is allowable ("YES" path out of decision block 1113), then the OFFSET is tested to determine whether it is equal to zero (decision block 1117). If the OFFSET is not equal to zero ("NO" path out of decision block 1117), then the OFFSET is decremented by 1, and the index variable is incremented by 1 (step 1119). Execution then returns to decision block 1113.

The routine continues in this fashion until the retrieved forbidden indicator 1005 indicates an allowable entry when the OFFSET is equal to zero ("YES" path out of decision block 1117). At this point, the index is used as an address into the table to retrieve a hop channel, which is then used as the present hop channel (step 1121) for communication during this phase. The phase is then updated (step 1107), and the routine repeats, beginning at decision block 1103.

The above-described technique has the benefit of not requiring separate storage for the allowable hop channels. Rather, a single hop sequence list is maintained that includes both allowable and forbidden hop channels. The extra space required to store the forbidden indicator 1005 column need only be negligible, because this is a binary value.

Another advantage of this technique is that it does not use the same substitute hop channel for every occurrence of a phase associated with a given forbidden hop channel. The reason for this is that the substitute hop channel is a function of the OFFSET value, which is itself, a function of the time-varying parameter, such as the CLOCK. Since this time varying parameter will be different for different accesses of the same forbidden hop channel (even at the same phase), the OFFSET will vary over time, as will the corresponding substitute hop channel.

In the above-described embodiment, the index was initialized to a value of 1 (see step 1111). As a result, the OFFSET represents the ith allowable hop channel starting at the beginning of the hop channel column 1003. In alternative embodiments, the index could be initialized to any value within the table. In such embodiments, the index must be adjusted to "wrap around" back to the beginning of the table when its value exceeds N1 (e.g., by use of modulo arithmetic).

The technique described with reference to FIGS. 10 and 11 operates by starting at a predetermined location within the hop channel table 1001 (e.g., at an index variable initialized to 1), and then examining each table entry, one at a time, until a suitable substitute hop channel is determined. For very long FH sequences, this may be a time consuming process whenever the OFFSET value happens to be a relatively large value. In another alternative embodiment to be described with reference to FIGS. 12 and 13, the substitute hop channel may be determined without the need for one-at-a-time inspection of table entries.

Referring first to FIG. 12, this is a diagram of a table 1201 that may be stored in a memory. The table 1201 has N1 rows, in correspondence with the N1 hop channels that make up an original hop sequence. Each row has three entries: a hop channel entry 1003, a forbidden indicator 1005, and a gap count 1203. As in earlier-described embodiments, the hop channel entry 1003 stores a hop channel that is originally planned to be used when the phase corresponds to that hop channel's row number, and the forbidden indicator 1005 stored in each row may be a binary value that indicates whether the hop channel (stored in the same row as the forbidden indicator) is forbidden. In the illustrated embodiment, a value of "0" is used to denote that the hop channel is not forbidden (i.e., that it is allowable), while a "1" is used to denote that the hop channel is forbidden.

The gap count entry 1203 is a number representing, for a given row in the table 1201, how many forbidden hops are associated with rows whose index is less than or equal to the index of the present row. The term "gap counter" is used because it is a measure of how many gaps, or forbidden hops, there are from a present location looking backward to the start of the table 1201. For example, the gap counts for each of the first two rows in the exemplary table 1201 are zero because each of the first two rows are associated with an allowable hop (i.e., the forbidden indicator 1005 for each of these rows is equal to 0). The gap count 1203 of row 3 is 1 because, of rows 1, 2 and 3, only row 3 contains a forbidden hop channel. In row 4, the gap count 1203 is equal to 2 because there are two forbidden hop channels associated with the rows from 1 to 4. The gap count 1203 of row 5 is also equal to 2 because there are two forbidden hop channels associated with the rows from 1 to 5.

The operation of this embodiment will now be described with reference to the flow chart of FIG. 13. The routine begins by setting the value of N2 equal to the number of allowable hops in the sequence (step 1301). Next, the present phase value is used as an index into the forbidden indicator column 1005 of the table 1201, and the value at this location is retrieved. If the retrieved forbidden indicator 1005 indicates that the corresponding hop channel is allowable (e.g., forbidden indicator (phase)=0), then the present hop channel is the corresponding hop channel (step 1305). After using the present hop channel for communication, the phase is then updated (step 1307), and the routine repeats, beginning at decision block 1303. It should be noted that in some embodiments, the phase is updated automatically by hardware, so that in such embodiments, no particular program instructions are required for this step.

Returning to decision block 1303, if the retrieved forbidden indicator 1005 indicates that the corresponding hop channel is not allowable ("NO" path out of decision block 1303), then a substitute hop channel is dynamically determined. This is accomplished by first determining an OFFSET in accordance with:

$$\text{OFFSET} = \text{mod}(\text{CLOCK}, N2) + 1, \qquad (3)$$

where the CLOCK represents a present clock value in the range from 0 to a maximum value that is preferably greater than or equal to N2−1 (step 1309). Of course in other embodiments, the clock value need not be used directly. Instead, any time-varying parameter capable of assuming values in the range from 0 to a maximum value that is preferably greater than or equal to N2−1 may be used. It will be recognized that if the time-varying parameter has a maximum value less than N2−1, then certain hop channels will be selected for use as substitute hop channels more frequently than others, thereby violating any randomness requirements that may be mandated by regulation. It is therefore preferred that the time-varying parameter be capable of taking on a maximum value at least equal to N2−1. When the time-varying parameter is, for example, a clock value, it is preferred that it be capable of taking on a maximum value well in excess of N2−1 in order to increase the randomness at which hop channels are selected for use as substitute hop channels. Of course, alternative embodiments can be constructed that use random (or pseudo-random) number generators instead of a clock value to generate the time-varying parameter.

The reason for the "+1" term in Equation (3) is that the OFFSET will be used directly as an address or index into the table 1201, whose lowest address/index is "1". Had the addressing/indexing been originated at "0", then there would be no need for the "+1" term in Equation (3).

After determining a value for OFFSET, a variable denoted LAST GAP COUNT is initialized to a value of 0 (step 1311).

Next, the gap count 1203 associated with the row OFFSET+LAST GAP COUNT is accessed and compared with the value of LAST GAP COUNT (decision block 1313). If they are equal ("YES" path out of decision block 1313), then the sum OFFSET+LAST GAP COUNT is used as an address into the table 1201 to retrieve a hop channel, which is then used as the present hop channel (step 1305) for communication during this phase. The phase is then updated (step 1307), and the routine repeats, beginning at decision block 1303.

If the gap count 1203 associated with the row OFFSET+LAST GAP COUNT is not equal to the value of LAST GAP COUNT, ("NO" path out of decision block 1313), then the value of LAST GAP COUNT is set equal to the present gap count in accordance with:

$$\text{LAST GAP COUNT} = \text{GAP COUNT}(\text{OFFSET}+\text{LAST GAP COUNT})$$

(step 1317). Processing then returns back to decision block 1313. As indicated earlier, the loop exits when the gap count stored in row OFFSET+LAST GAP COUNT is equal to the LAST GAP COUNT.

The above-described technique has the benefit of not requiring separate storage for the allowable hop channels. Rather, a single hop sequence list is maintained that includes both allowable and forbidden hop channels. The extra space required to store the forbidden indicator 1005 column need only be negligible, because this is a binary value. The additional memory needed to store the gap count 1203 is also not exorbitant, and may be well justified by the increase in processing speed that it enables.

Figure 13:
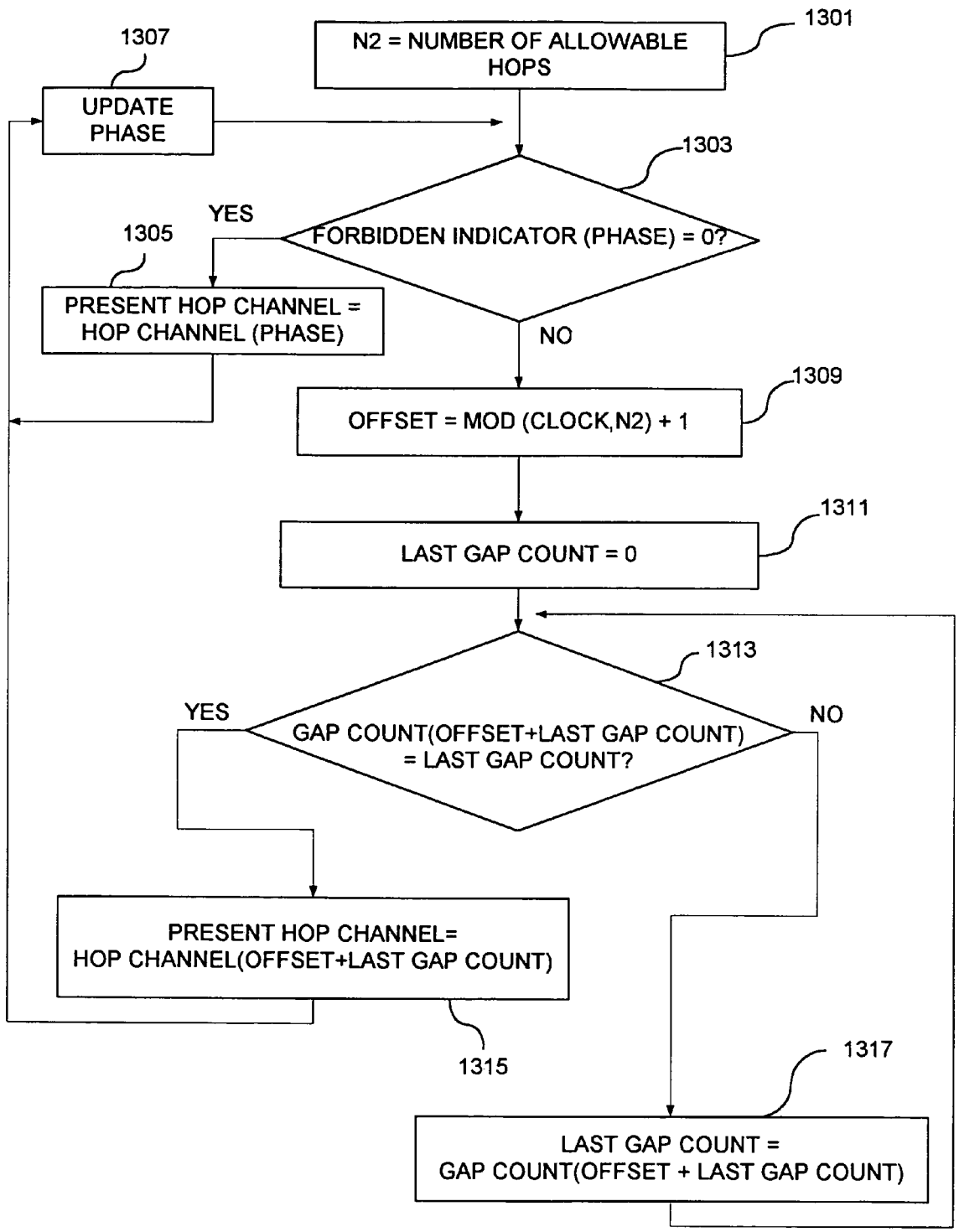
FIG. 13 is a flow chart of operations for determining a suitable hop channel in accordance with an alternative embodiment of the invention.

Another advantage of the technique described with respect to FIGS. 12 and 13 is that it does not use the same substitute hop channel for every occurrence of a phase associated with a given forbidden hop channel. The reason for this is that the substitute hop channel is a function of the OFFSET value, which is itself, a function of the time-varying parameter, such as the CLOCK. Since this time varying parameter will be different for different accesses of the same forbidden hop channel (even at the same phase), the OFFSET will vary over time, as will the corresponding substitute hop channel.

In the above-described embodiment, the gap count 1203 is computed for each entry under the assumption that the computed OFFSET is an index starting at the first row of the table 1201. In alternative embodiments, the gap count 1203 could be computed under the assumption that the computed OFFSET value is an index having an initial reference point at some other point in the table (e.g., at the row that is immediately after the row containing the "highest" forbidden hop channel, where "highest" is referenced from the beginning of the table). In such embodiments, the quantity OFFSET+LAST GAP COUNT must be adjusted to "wrap around" back to the beginning of the table when its value exceeds N1 (e.g., by use of modulo arithmetic).

Figure 14:
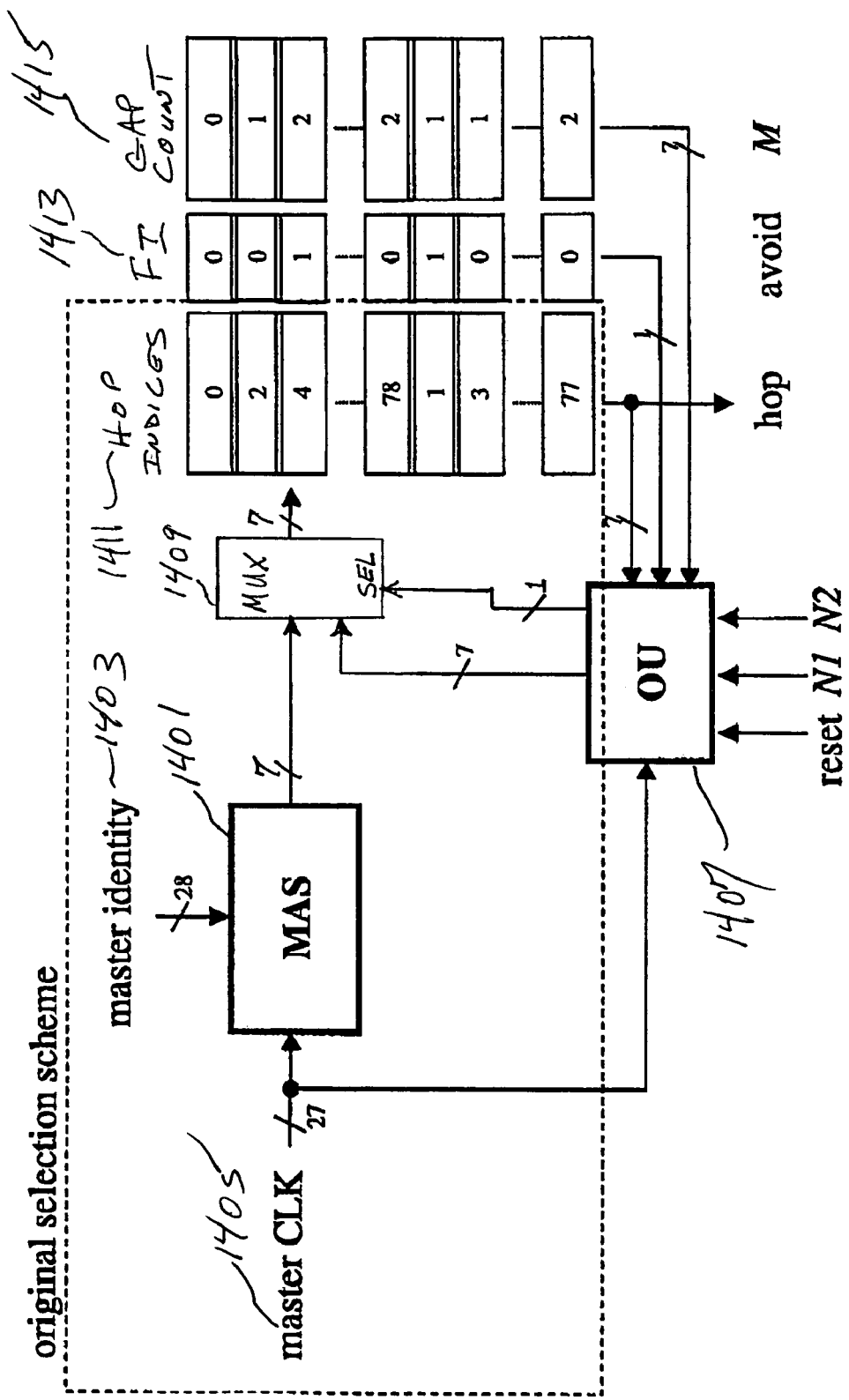
FIG. 14 is a block diagram of a frequency hop generator for use in a Bluetooth system, in accordance with an embodiment of invention.

A block diagram of a suitable embodiment of the invention for use in the Bluetooth system is shown in FIG. 14. In the Bluetooth system, the hop selection mechanism makes use of a memory address selector (MAS) 1401 which is driven by a master identity or address 1403 and a master clock 1405, and an ordered list of 79 hop indices. The hop indices range from 0 to 78 and point to the hop frequencies ranging from 2402 to 2480 MHZ. The list is partitioned into two parts, where the first part contains all even numbered hop indices (ordered from smallest to largest or from 0 to 78) and the second part contains all odd numbered hop indices (ordered from smallest to largest or from 1 to 77). The output of the MAS 1401 is a 7-bit word representing an integer value between 0 and 78, and pointing to a memory location in the ordered hop indices list. The output from the MAS 1401 supplies data to one input of a multiplexor (MUX) 1409. An offset unit (OU) 1407 is also provided, which supplies data to a second input of the multiplexor 1409. The output of the multiplexor 1409 is supplied to the memory for use as an address into the ordered list.

Multiplexor operation is controlled by a SELECT signal that is supplied by the OU 1407.

In addition to the above-described components, the memory locations of the ordered list are extended with two fields. The first 7-bit field, Hop Indices 1411, is the original field containing the ordered hop indices. The second field, Forbidden Indicator (FI) 1413 is a 1-bit field that indicates whether the index points to a hop carrier that should be avoided. (In this example, setting the bit equal to 1 means the hop carrier must be avoided). The third field, Gap Count 1415, contains a 7-bit value M which, as explained above with reference to FIGS. 12 and 13, represents the number of so-called forbidden hops whose indices are less than or equal to that of the current hop carrier. In the example shown in FIG. 14, hops 1 and 4 are forbidden. Therefore, M=0 for hop 0, M=1 for hops 1 to 3, and M=2 for all hops 4 and larger.

At the start of a new hop selection procedure, the OU 1407 is reset, so that it supplies a SELECT signal that causes the multiplexor 1409 to pass the address supplied by the MAS 1401. The output of the MAS 1401 points to a hop carrier in accordance with the original FH sequence. The memory location selected by the address indicates what hop carrier is selected by means of the contents of the Hop Indices field 1411, and indicates whether this is a forbidden hop or not by means of the contents of the FI field 1413. If the FI field 1413 contains a bit value of zero, the OU 1407 does not take any action and the hop carrier as selected is used. However, if the bit in the FI field 1413 has a value of one, the hop is forbidden and an avoidance action must be carried out.

To carry out the avoidance action, the OU 1407 generates a SELECT signal that causes its own data to appear at the output of the multiplexor 1409. Then, the OU 1407, operating in accordance with the techniques discussed above with respect to FIG. 13, utilizes the master clock value, the count of allowable hops (N2), the output of the FI field 1413 and the output of the Gap Count field 1415 to determine a suitable address for selecting a substitute hop carrier. As indicated by the flowchart of FIG. 13, this may mean accessing the memory a number of times before arriving at a suitable result.

After the substitute hop carrier has been identified at the output of the memory, the OU 1407 changes the value of the SELECT signal so that it will again pass the address supplied by the MAS 1401 during the next hop selection process.

The disclosed hop avoidance techniques have two advantages. First, they are very general and can be applied to any existing hop selection scheme. They are on-line techniques, and do not require considerable processing. Even more advantageous is the fact that the new, revised FH sequence generated by the inventive techniques is identical to the original FH sequence in all of the positions in which a hop-avoidance action was not required. If there are only a few hops to avoid, the original FH sequence is left almost intact. Only during the few instances in which a forbidden hop is visited does the revised FH sequence differ from the original FH sequence. This is illustrated in FIGS. 15(*a*) and 15(*b*). In FIG. 15(*a*), it is assumed that hops 5 and 62 are forbidden. As shown in FIG. 15(*b*) hop 62 is mapped to hop 73 in this example. As to hop 5, note that the first time it is avoided (see 1501), hop 5 is mapped to hop 6. However, the second time hop 5 is avoided (see 1503), it is mapped to hop 25. These differences arise from the fact that the clock is different when the hop avoidance technique is performed. The original and revised hopping sequences only differ when the original selection scheme points to 5 or 62. This is a positive effect in piconets comprising a mix of older devices that cannot apply hop avoidance, and more advanced devices that include hop avoidance. To be able to implement hop avoidance, the master must have the capability to apply the avoidance scheme. Slave devices that also have the hop-avoidance feature can follow the master in synchrony. However, the master can still serve slave devices that do not include the hop avoidance scheme. These slaves can communicate with the master on most of the hops, but if an avoidance action occurs, they momentarily lose the master. However, since the revised sequence is identical to the original sequence at all other times, the old slaves do not lose synchrony. They continue to communicate with the master when the avoidance action is not carried out. So, once in a while, the slave loses connection with the master for one or a few hops. Since the slave will not lose synchrony unless it has missed a large number of consecutive hops, no problems arise. The master may control the traffic on the piconet in the manner described in U.S. patent application Ser. No. 09/210,594, filed on Dec. 15, 1998 in the name of J. C. Haartsen and J. Elg and entitled "Central multiple access control for FH radio networks," which application is hereby incorporated herein by reference in its entirety. To prevent the impact of the hop avoidance on the old slave, the master simply refrains from scheduling transmissions to the old slaves during those moments in which a hop avoidance action occurs. In those cases, no information is lost. Moreover, since a slave is only allowed to respond when it has received a packet from the master in the preceding hop, the master should not schedule a transmission to an old slave one hop prior to a hop in which the avoidance action will occur. In those cases, the slave will never transmit on a forbidden hop. With these two simple scheduling actions in the master, communications between the master and old slaves that have not implemented the hop avoidance scheme will implicitly avoid transmissions in forbidden hops. New slaves that do have the hop avoidance capability can of course communicate with the master at any time.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of selecting a hop channel for use in a channel hopping communication system that communicates over a physical channel and includes a sequence of hop channels comprising a set of forbidden hop channels and a remaining set of allowable hop channels, the method comprising the steps of:

selecting a hop channel from the sequence as a function of a present phase;

if the selected hop channel belongs to said set of allowable hop channels, then using the selected hop channel for communication during the present phase; and if the selected hop channel belongs to said set of forbidden hop channels, then:

using a time-varying parameter to select, at the present phase, a substitute hop channel from the set of allowable hop channels, wherein the time-varying parameter is independent of conditions on the physical channel and a determination as to the selection of a hop channel as the substitute hop channel from the set of allowable hop channels is made each time the selected hop channel belongs to the set of forbidden hop channels wherein a forbidden hop channel is mapped onto each of the allowable hop channels with equal probability; and using the substitute hop channel for communication during the present phase.

2. The method of claim 1, wherein the time-varying parameter is a clock value.

3. The method of claim 1, wherein the time-varying parameter and the present phase are derived from a same clock value.

4. The method of claim 1, wherein the time-varying parameter is a randomly selected value.

5. The method of claim 1, wherein the time-varying parameter is a pseudo-randomly selected value.

6. The method of claim 1, wherein at least one of the forbidden hop channels is associated with received interference from a jammer.

7. The method of claim 1, wherein at least one of the forbidden hop channels is reserved for use by a communication system that is not the channel hopping communication system.

8. The method of claim 1, further comprising the step of dynamically determining the set of forbidden hop channels, whereby the set of forbidden hop channels varies over time.

9. The method of claim 1, further comprising the step of forming a sequence of allowable hop channels from the set of allowable hop channels, and wherein the step of using a time-varying parameter to select a substitute hop channel from the set of allowable hop channels comprises the steps of:

forming an index value from the time-varying parameter;

using the index value to select one of the allowable hop channels from the sequence of allowable hop channels; and using the selected allowable hop channel as the substitute hop channel.

10. The method of claim 9, wherein the step of determining the index value as a function of the time-varying parameter comprises determining the expression:

index value=mod(time-varying parameter, N2)+BASE VALUE, where mod (j,k) denotes j modulo k, N2 is the number of allowable hop channels in the sequence of allowable hop channels and BASE VALUE represents an index value of the first allowable hop channel in the sequence of allowable hop channels.

11. The method of claim 1, wherein the step of using a time-varying parameter to select a substitute hop channel from the set of allowable hop channels comprises the steps of:

determining an index value, i, as a function of the time-varying parameter;

designating one of the allowable hop channels in the sequence of hop channels as a first hop channel;

starting at the first hop channel, processing the sequence of hop channels to determine an ith allowable hop channel in the sequence of hop channels; and selecting the ith allowable hop channel for use as the substitute hop channel.

12. The method of claim 11, wherein the first hop channel is the first hop channel in the sequence of hop channels.

13. The method of claim 11, wherein:

the first hop channel is a first hop channel after a last forbidden hop channel in the sequence of hop channels; and the step of processing the sequence of hop channels to determine an ith allowable hop channel in the sequence of hop channels wraps around to the start of the sequence of hop channels when is greater than the number of hop channels following the last forbidden hop channel in the sequence of hop channels.

14. The method of claim 11, wherein the step of processing the sequence of hop channels to determine an ith allowable hop channel in the sequence of hop channels comprises the steps of:

starting at the first hop channel and continuing with each successive hop channel in the sequence of hop channels, determining whether the hop channel is an allowable hop channel; and stopping when an ith allowable hop channel has been identified in the sequence of hop channels.

15. The method of claim 11, further comprising the step of:

for each of the hop channels in the sequence of hop channels, determining a gap count that represents how many forbidden hop channels are in the sequence of hop channels from the first hop channel up to and including said each of the hop channels;

and wherein the step of processing the sequence of hop channels to determine an ith allowable hop channel in the sequence of hop channels comprises the steps of:

(a) using the index value plus a previous gap count to select one of the hop channels from the sequence of hop channels; and (b) if the selected hop channel is associated with a present gap count that is equal to the previous gap count, then using the selected hop channel as the substitute hop channel, otherwise setting the previous gap count equal to the present gap count and repeating steps (a) and (b).

16. The method of claim 1, wherein the substitute hop channel need not be the same as a previously selected substitute channel for the forbidden hop channel.

17. The method of claim 1, wherein the time-varying parameter is based on a system clock.

18. The method of claim 1, wherein the substitute hop channel is selected in a dynamic manner.

19. The method of claim 1, wherein each of the allowable hop channels is available for selection as the hop channel.

20. The hop channel selector of claim 1, wherein each of the allowable hop channels is available for selection as the substitute hop channel.

21. The hop channel selector of claim 19, wherein each of the allowable hop channels is also available for selection as the substitute hop channel.

22. A hop channel selector for use in a channel hopping communication system that communicates over a physical channel and includes a sequence of hop channels comprising a set of forbidden hop channels and a remaining set of allowable hop channels, the hop channel selector comprising:
  logic configured to select a hop channel from the sequence as a function of a present phase;
  logic configured to use the selected hop channel for communication during the present phase if the selected hop channel belongs to said set of allowable hop channels; and
  logic configured to use a time-varying parameter to select, at the present phase, a substitute hop channel from the set of allowable hop channels and to use the substitute hop channel for communication during the present phase if the selected hop channel does not belong to said set of allowable hop channels, wherein the time-varying parameter is independent of conditions on the physical channel and a determination as to the selection of a hop channel as the substitute hop channel from the set of allowable hop channels is made each time the selected hop channel belongs to the set of forbidden hop channels wherein a forbidden hop channel is mapped onto each of the allowable hop channels with equal probability.

23. The hop channel selector of claim 22, wherein the time varying parameter is a clock value.

24. The hop channel selector of claim 22, wherein the time-varying parameter and the present phase are derived from a same clock value.

25. The hop channel selector of claim 22, wherein the time-varying parameter is a randomly selected value.

26. The hop channel selector of claim 22, wherein the time-varying parameter is a pseudo-randomly selected value.

27. The hop channel selector of claim 22, wherein at least one of the forbidden hop channels is associated with received interference from a jammer.

28. The hop channel selector of claim 22, wherein at least one of the forbidden hop channels is reserved for use by a communication system that is not the channel hopping communication system.

29. The hop channel selector of claim 22, further comprising logic configured to dynamically determine the set of forbidden hop channels, whereby the set of forbidden hop channels varies over time.

30. The hop channel selector of claim 22, further comprising logic configured to form a sequence of allowable hop channels from the set of allowable hop channels, and wherein the logic configured to use a time-varying parameter to select a substitute hop channel from the set of allowable hop channels comprises:
  logic configured to form an index value from the time-varying parameter;
  logic configured to use the index value to select one of the allowable hop channels from the sequence of allowable hop channels; and
  logic configured to use the selected allowable hop channel as the substitute hop channel.

31. The hop channel selector of claim 30, wherein the logic configured to determine an index value as a function of the time-varying parameter comprises logic configured to determine the expression:
  index value=mod (time-varying parameter, N2)+BASE VALUE, where mod (j,k) denotes j modulo k, N2 is the number of allowable hop channels in the sequence of allowable hop channels and BASE VALUE represents an index value of the first allowable hop channel in the sequence of allowable hop channels.

32. The hop channel selector of claim 22, wherein the logic configured to use a time-varying parameter to select a substitute hop channel from the set of allowable hop channels comprises:
  logic configured to determine an index value, i, as a function of the time-varying parameter;
  logic configured to designate one of the allowable hop channels in the sequence of hop channels as a first hop channel,
  logic configured to process the sequence of hop channels, starting at the first hop channel, to determine an ith allowable hop channel in the sequence of hop channels; and
  logic configured to select the ith allowable hop channel for use as the substitute hop channel.

33. The hop channel selector of claim 32, wherein the first hop channel is the first hop channel in the sequence of hop channels.

34. The hop channel selector of claim 32, wherein:
  the first hop channel is a first hop channel after a last forbidden hop channel in the sequence of hop channels; and
  the logic configured to process the sequence of hop channels to determine an ith allowable hop channel in the sequence of hop channels is configured to wrap around to the start of the sequence of hop channels when i is greater than the number of hop channels following the last forbidden hop channel in the sequence of hop channels.

35. The hop channel selector of claim 32, wherein the logic configured to process the sequence of hop channels to determine an ith allowable hop channel in the sequence of hop channels comprises:
  logic configured to:
    determine, starting at the first hop channel and continuing with each successive hop channel in the sequence of hop channels, whether the hop channel is an allowable hop channel; and
    stop when an ith allowable hop channel has been identified in the sequence of hop channels.

36. The hop channel selector of claim 32, further comprising:
  logic configured to determine a gap count for each of the hop channels in the sequence of hop channels, wherein the gap count represents how many forbidden hop channels are in the sequence of hop channels from the first hop channel up to and including said each of the hop channels; and wherein the logic configured to process the sequence of hop channels to determine an ith allowable hop channel in the sequence of hop channels comprises logic configured:

(a) to use the index value plus a previous gap count to select one of the hop channels from the sequence of hop channels; and (b) to use the selected hop channel as the substitute hop channel if the selected hop channel is associated with a present gap count that is equal to the previous gap count, otherwise to set the previous gap count equal to the present gap count and repeating operations (a) and (b).

37. The hop channel selector of claim 22, wherein the substitute hop channel need not be the same as a previously selected substitute channel for the forbidden hop channel.

38. The hop channel selector of claim 22, wherein the time varying parameter is based on a system clock.

39. The hop channel selector of claim 22, wherein the substitute hop channel is selected on a dynamic basis.

40. The hop channel selector of claim 22, wherein each of the allowable hop channels is available for selection as the hop channel.

41. The hop channel selector of claim 22, wherein each of the allowable hop channels is available for selection as the substitute hop channel.

42. The hop channel selector of claim 40, wherein each of the allowable hop channels is also available for selection as the substitute hop channel.

* * * * *

UNITED STATES PATENT AND TRADEMARK OFFICE
CERTIFICATE OF CORRECTION

PATENT NO. : 7,280,580 B1
APPLICATION NO. : 09/418562
DATED : October 9, 2007
INVENTOR(S) : Haartsen It is certified that error appears in the above-identified patent and that said Letters Patent is hereby corrected as shown below:

On the Title Page, in Item (73), under "Assignee", in Column 1, Line 1, delete "Telefonaktlebolaget" and insert -- Telefonaktiebolaget --, therefor.

In Column 4, Line 6, delete "2∞" and insert -- $2^{28}$ --, therefor.

In Column 7, Line 33, delete "channels;" and insert -- channels (HC); --, therefor.

In Column 20, Line 33, in Claim 13, after "when" insert -- i --.

Signed and Sealed this

Thirtieth Day of September, 2008

JON W. DUDAS
*Director of the United States Patent and Trademark Office*